Patented Oct. 17, 1939

2,176,201

UNITED STATES PATENT OFFICE 2,176,201

PRODUCTION OF HYDROXY ALIPHATIC ESTERS

Benjamin T. Brooks, Old Greenwich, Conn., assignor to Standard Alcohol Company

No Drawing. Application July 29, 1937, Serial No. 156,311

10 Claims. (Cl. 260—484)

The process of the present invention relates to the manufacture of esters of organic acids containing a hydroxyl group, and more specifically, to an improved process for producing esters of hydroxy acids with increased yields and less loss by decomposition.

In the esterification of hydroxy acids by heating with alcohols, the yields of ester are diminished by the formation of other products. For example, glycollic acid forms glycolid, an intramolecular anhydride or ester, and polyglycolid, lactic acid forms lactid, and when the hydroxyl group is further removed from the carboxyl group, lactones are readily formed. When inorganic acids are employed to catalyze the esterification, decomposition of the hydroxy acid occurs. The formation of water by these reactions also decreases the formation of ester according to well known principles of acid-alcohol-ester equilibria.

A well known method of producing derivatives of acids containing hydroxyl groups is to replace a halogen atom by a hydroxyl group, as by heating the substance with an aqueous alkali solution, heating with anhydrous sodium acetate to form an acetate and then saponifying the acetate group. When the well known methods of replacing a halogen by the hydroxyl or OH group are carried out with chlorinated fatty acid esters, saponification of the ester group also occurs, yielding, mainly, alkali salts of the hydroxy acid which must then be esterified with the difficulties and disadvantages set forth above.

If it is desired to directly esterify a hydroxy acid, this may be accomplished by first reacting the same with formic acid so as to esterify the hydroxy group. If, on the other hand, the available material is a fatty acid, such as acetic acid for example, the first step should be to chlorinate the acid or its ester to produce chloro derivatives. It will be understood that this may be applied to other fatty acids besides acetic, but this serves as an excellent example. The second step is to heat the said chloro derivatives with sodium or potassium formate so as to remove the chlorine atoms as an inorganic chloride and to produce a formic acid ester. For example:

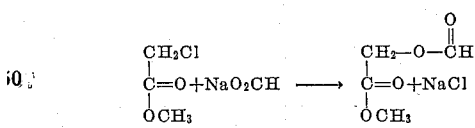

The formic acid ester, whether produced by the one or the other of the above two methods, is then heated with an excess of a low molecular weight alcohol, such as methyl alcohol, to produce the ester of the hydroxy acid.

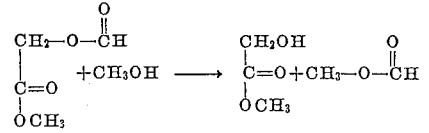

It has been found that when producing esters of hydroxy acids from chlorinated aliphatic esters the two reactions may be carried out simultaneously in the same reaction vessel by adding to the chloro ester an amount of an alkali formate and an excess of low molecular weight alcohol, such as methyl alcohol. In this way esters of hydroxy acids, such as of glycollic acid, can be obtained in good yields.

The reaction mixture should preferably be heated in an autoclave at about 110° to 130° C. for several hours. When the reaction is completed the liquid mixture is separated from the salt which separates during the reaction and the liquid mixture is fractionally distilled. The methyl formate and excess methyl alcohol may be separated by fractional distillation but it is preferred to collect the methyl formate and methyl alcohol distillates together, add caustic potash or caustic soda in sufficient quantity to saponify the methyl formate, resulting thus in a methyl alcohol solution of potassium or sodium formate which is used in another similar operation.

When the desired hydroxy acid ester is the methyl ester, the halogenated fatty acid may be used instead of the halogenated fatty acid methyl ester. When this is done, esterification proceeds rapidly when heated in an autoclave to 110° to 130° C., but esterification is never complete on account of the water formed in the reaction. For this reason the yields are higher when chlorinated fatty acid esters are used.

In the case of hydroxy esters of the higher alcohols the yield is diminished slightly by interchange of the methyl and higher alcohol groups, requiring separation of the two esters by fractional distillation, the methyl ester boiling lower.

Another method of carrying out the process of the present invention, which gives nearly theoretical yields, is to fractionally distill the methyl formate, which is always the lowest boiling constituent of the reaction mixture, from the reaction mixture under pressure. Thus, instead of a closed autoclave, the reaction is carried out in a still provided with a fractionating column, the whole being maintained under pressure and the desired temperature of 110° to 130° maintained in the still. A pressure relief valve is placed on the outlet of the fractionating column and the methyl formate is vented to a condenser as the reaction proceeds. In this case it is not necessary to use a large excess of methyl alcohol in the reaction mixture, since, due to the removal of methyl formate, the alcoholysis of the intermediate formate proceeds to completion.

Steel apparatus may be employed but copper lined or silver lined apparatus is preferable, since slight decomposition occurs on heating some of the chlorinated fatty acid esters, particularly when containing highly chlorinated impurities.

The halogenated fatty acid esters used are mainly the chloro derivatives. The bromine derivatives also give good results but have more tendency to decompose to give free acid than the chloro derivatives. The iodo derivatives are too unstable, too difficult to prepare and too expensive to be of practical value.

As examples of the process of the present invention, methyl chloroacetate and methyl-alpha and beta-chloropropionates were found to give yields of 84% to 86% of the theoretical yields of methyl hydroxy esters when heated for five hours at 110° to 115° C. with 1½ mols of potassium formate and 10 mols of methyl alcohol.

Both the alpha and beta chloro-derivatives of propionic esters react satisfactorily with alkali formates in methyl and ethyl alcohols to give the corresponding hydroxy propionic esters. When a mixture of the two isomeric chloropropionic esters are employed, the product consists of a mixture of the corresponding hydroxy propionic esters. Both hydroxy propionic esters are valuable in solvent compositions containing cellulose acetate or nitrate. Ethyl lactate is well known as a solvent for such cellulose esters, in lacquer compositions, but a mixture of the two hydroxy propionic esters, such as are obtained by chlorinating propionic acid, esterifying the mixed chloro acids and then heating under pressure with alkali formate and methyl or ethyl alcohol, constitutes an excellent solvent for cellulose acetate and nitrate.

Methyl alcohol is the preferred alcoholic reaction medium as the reaction with the intermediate formate is more rapid than with the higher alcohols. Thus the simple aliphatic alcohols of less than 5 carbon atoms, such as ethyl, isopropyl and butyl, can be successfully employed as the reaction media. The pressures developed at the temperatures required, 110° to 130°, are not as high as with methyl alcohol, but the mol volume is greater. When ethyl or isopropyl alcohols are used, the ethyl and isopropyl hydroxy fatty acid esters are produced in a pure condition. For example, isopropyl chloroacetate was heated with 1¼ mols of potassium formate and 5 mols of isopropyl alcohol at 110° to 115° C. for four hours and slowly fractionated to remove isopropyl formate under a pressure of 80 to 90 lbs. and a yield of 85% of the theory of isopropyl glycolate obtained. Fractionation under pressure, during the progress of the reaction to remove alcohol formate, is more advantageous when ethyl, isopropyl or butyl alcohols are used than in the case of methyl alcohol. Ethyl lactate may thus be made by heating ethyl alpha chloropropionate $CH_3CHCl.CO_2C_2H_5$ with sodium or potassium formates in methyl or ethyl alcohol solution under the conditions above described.

The invention is not to be limited to the specific embodiments, nor to any theories advanced as to the operation of the invention, but in the appended claims it is intended to claim all inherent novelty in the invention as broadly as the prior art permits.

I claim:

1. The method of producing esters of organic acids containing a hydroxyl group which comprises reacting a formic acid ester of a hydroxy lower molecular weight saturated fatty acid ester and an aliphatic alcohol containing not more than 5 carbon atoms.

2. The method of producing esters of organic acid containing a hydroxyl group according to claim 1 in which the aliphatic alcohol is methyl alcohol.

3. The method of producing esters of organic acids containing a hydroxyl group which comprises heating at a temperature of about 100° to 140° C., a mixture of a mono-halogenated lower molecular weight saturated fatty acid methyl ester with an alkali salt of formic acid and an excess of an aliphatic alcohol containing not more than five carbon atoms to the molecule.

4. The method of producing esters of organic acids containing a hydroxyl group which comprises heating at a temperature of about 100° to 140° C. and under superatmospheric pressure, a mixture of a mono-halogenated lower molecular weight saturated fatty acid methyl ester with an alkali salt of formic acid and an excess of an aliphatic alcohol containing not more than five carbon atoms.

5. The method of producing esters of organic acids containing a hydroxyl group according to claim 4 in which an excess of methyl alcohol is used.

6. The method of producing esters of organic acids containing a hydroxyl group which comprises heating at a temperature of about 100° to 140° C. and under superatmospheric pressure, a mixture of a mono-halogenated lower molecular weight saturated fatty acid methyl ester with an alkali salt of formic acid and an aliphatic alcohol containing not more than 5 carbon atoms to the molecule and removing a formate of the aliphatic alcohol as it is formed.

7. The method of producing esters of organic acids containing a hydroxyl group according to claim 6 in which the aliphatic alcohol used is methyl alcohol and the formate of the aliphatic acid removed is methyl formate.

8. The method of producing esters of organic acids containing a hydroxyl group which comprises heating at a temperature of about 100° to 140° C. and under superatmospheric pressure, a mixture of a mono-halogenated lower molecular weight saturated fatty acid methyl ester with an alkali salt of formic acid and an aliphatic alcohol, separating the salt that has been formed thereby and fractionally distilling the liquid mixture to separate the solvent from the product.

9. The method of producing a mixture of isomeric hydroxy-propionic esters which comprises heating a mixture of alpha and beta chloropropionic esters with an alkali salt of formic acid and an excess of an aliphatic alcohol.

10. The method of producing a mixture of isomeric hydroxy-propionic esters according to claim 9 in which the aliphatic alcohol used is methyl alcohol.

BENJAMIN T. BROOKS.